United States Patent [19]

Clark

[11] Patent Number: 5,664,364
[45] Date of Patent: Sep. 9, 1997

[54] FISHHOOK

[76] Inventor: Thomas C. Clark, Rte. 1, Box 137, Hampton, Fla. 32044

[21] Appl. No.: 443,853

[22] Filed: May 22, 1995

[51] Int. Cl.⁶ .......................... A01K 91/04; A01K 83/00; A01K 83/06
[52] U.S. Cl. .............................. 43/43.16; 43/44.8
[58] Field of Search .................. 43/43.16, 44.8, 43/44.82, 42.24

[56] References Cited

U.S. PATENT DOCUMENTS

| | | | |
|---|---|---|---|
| 551,582 | 12/1895 | Crane | 43/44.8 |
| 2,148,074 | 2/1939 | Kaspick | 43/44.8 |
| 2,750,704 | 6/1956 | Bemis | 43/43.16 |
| 3,000,131 | 9/1961 | Stinson | 43/44.8 |
| 3,724,116 | 4/1973 | Lindner | 43/44.8 |
| 4,232,470 | 11/1980 | Steffick | 43/43.16 |
| 4,294,031 | 10/1981 | Manno | 43/43.16 |
| 4,506,470 | 3/1985 | Adams | 43/44.8 |
| 4,905,403 | 3/1990 | Manno | 43/43.16 |
| 5,138,790 | 8/1992 | McManus | 43/43.16 |
| 5,373,658 | 12/1994 | Huppert | 43/43.16 |

*Primary Examiner*—Kurt Rowan
*Attorney, Agent, or Firm*—Arthur G. Yeager

[57] ABSTRACT

A fishhook with an eye, a shank, and a point and having a return bend portion in the shank spaced closely apart from the eye, the component of the return bend portion closest to the eye being an angular bend in the shank of about 60 degrees to 90 degrees.

13 Claims, 2 Drawing Sheets

FISHHOOK

BACKGROUND OF THE INVENTION

TECHNICAL FIELD

This invention relates to the technical field of fishing equipment.

PRIOR ART

Fishing is a trade to many people in the world and a sport to others. Nevertheless, it has been in existence for as long as man has been on this earth, and a basic implement for much of that time has been a hook. A small piece of food as bait is attached to the hook which is then placed or cast into the water with the hope of catching a fish that tries to eat the bait. In more recent times the bait has been a fanciful creation which man hopes will look enough like food to attract a fish. One of the commonest forms of bait today is a molded gelatinous plastic article that is easily pierced by a sharp point, and therefore, can be strung on a hook, usually with a hard portion covering a substantial portion of the shank and point of a fishhook and leaving a flexible, waving tail to trail behind in the water currents. The only significant problem present by such an artificial bait or lure is that the gelatinous material slides very easily on the shank of the hook upon which the lure is strung. This may be caused by pulling the lure through weeds or rocks in the waters being fished; and when that happens the shank is exposed, destroying the appearance of the lure as food to the fish. This problem has never been solved satisfactorily in the past, and the present invention is believed to be a great improvement in this technical field.

It is an object of this invention to provide an improved fishhook for use with gelatinous lures. It is another object of this invention to provide a fishhook which greatly resists the sliding of gelatinous lures along the shank of the hook, and therefore, provides a more useful lure. Still other objects will become apparent from the more detailed description which follows.

BRIEF SUMMARY OF THE INVENTION

This invention relates to a fishhook having an eye, a point generally directed at the eye, and a wire shank forming a smooth curve connecting the eye to the point; the improvement in this invention being that a portion of the shank adjacent the eye is formed into a protrusion extending about 0.1–0.3 inch laterally outward from the shank at a sharp angle.

In specific and preferred embodiments the protrusion is a return bend in the shank, most preferably in the form of the letter U or V with the width and length of the letter being about equal. In its most preferred form, the side of the letter closest to the eye of the fishhook is bent at an angle of about 60 degrees to 90 degrees with the shank, and is connected to a short length of shank separating the protrusion from the eye.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE PREFERRED EMBODIMENT

Figure 1:
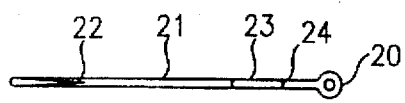
FIG. 1 is a top plan view of a first embodiment of a fishhook of this invention.

The features of this invention can best be understood by reference to the attached drawings and the numbered components.

FIGS. 1–3, 7 and 8 show different embodiments of the fishhook of this invention. Each fishhook has an eye 20 to provide a place for tying the hook to a fishing line. Each fishhook has a pointed end, usually a barbed hook 22 which points generally in the direction of the eye 20. Connecting the eye 20 to the point 22 is a wire shank 21, usually in a smoothly curving design such as any of those shown in FIGS. 2, 3, 7, and 8. The size of the curve, and the size of the wire varies depending on the type and size of fish that one expects to catch, i.e., larger size wire and larger curve for larger fish. All of the above-mentioned features of this design are found on present day fishhooks and are not considered to be novel features. The present invention relates to the return bend portion 23 of the shank. Being a part of the shank 21 all of the return bend portion 23 is wire bent to form a lateral protrusion extending sideways outwardly from the otherwise smooth curve of the shank. It is considered to be a "return bend" portion because one length of the wire is bent away from the shank 21 and another length of the wire is bent back again to return to the main portion of the shank 21. As may be seen the bent portion 23 may look like any of the letters U, V, or R. In general each bent portion 23 has, on the side closest to eye 20 an outward component 24 that makes an included angle 25 with neck 38 of an amount between about 60 degrees and 90 degrees. This is considered a sharp change of direction and is important when rigging a plastic gelatinous bait onto the hook as will be discussed with reference to FIGS. 4–6. In the R-type hook angle 25 is about 60 degrees; in the U-type hook angle 25 is about 90 degrees; and in the V-type hook angle 25 is close to 90 degrees. Neck 38 is a short straight length of shank 21 which serves as a spacer between bent portion 23 and eye 20. Neck 38 is important merely to provide space for the head of the plastic lure. The remaining sides of the bent portion 23 are not critical in shape, although necessarily small in size to fit into the hook design. Most hooks of this type will be within an overall length range of about 1–4 inches, and for such hooks the bent portion will range from about 0.1–0.4 inch in both the lengthwise and lateral directions. The length of neck 38 is also not critical, although generally it will be from about 0.5–1.0 times the diameter of the portion of the fish lure head that is positioned adjacent the eye 20. In absolute dimensions neck 38 will be about 0.1–0.5 inch in length.

Figure 5:
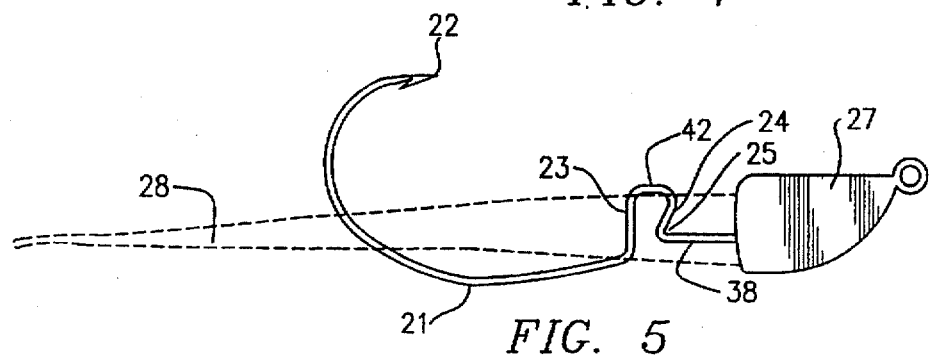
FIG. 5 is a side elevational view of a nonweedless lure employing the fishhook of FIGS. 1 and 2.
Figure 6:
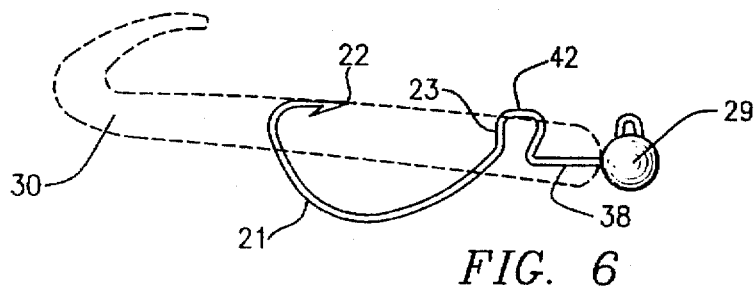
FIG. 6 is a side elevational view of weedless jig employing the fishhook of FIGS. 1 and 2.
Figure 7:
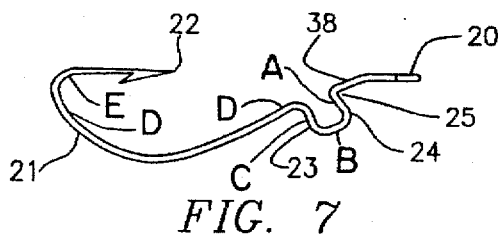
FIG. 7 is a side elevational view of a third embodiment of a fishhook of this invention.
Figure 8:
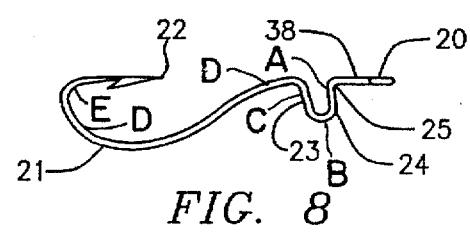
FIG. 8 is a side elevational view of a fourth embodiment of a fishhook of this invention.

The shape of return bend portion 23 is shown as somewhat similar to the letter R in FIGS. 2–6; the letter U in FIG. 7; and the letter V in FIG. 8. Although the return bend portion 23 may protrude outward in any direction, its preferred position is to remain in the same plane as that which contains point 22 and shank 21 as shown in FIG. 1. Furthermore, in that same plane return bend portion 23 may protrude upwards (as in FIGS. 2 and 3) or downwards (as in FIGS. 7 and 8), the upwards orientation being preferred.

Figure 2:
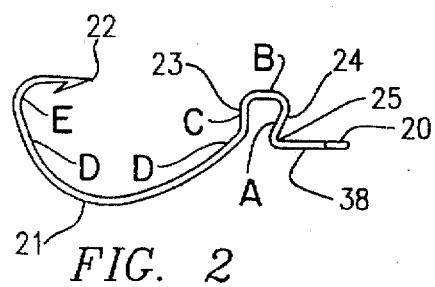
FIG. 2 is a side elevational view of the fishhook of FIG. 1.
Figure 3:
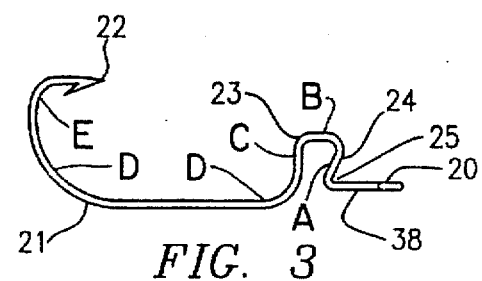
FIG. 3 is a side elevational view of a second embodiment of a fishhook of this invention.
Figure 4:
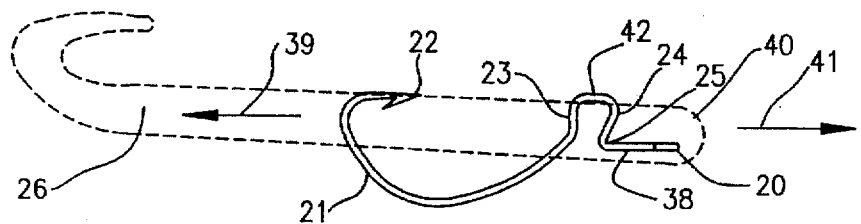
FIG. 4 is a side elevational view of a weedless lure employing the fishhook of FIGS. 1 and 2.

In FIGS. 4, 5 and 6 there are shown various types of fish lures wherein a fishhook of this invention is rigged with a plastic gelatinous lure. In FIG. 4 a lure 26 resembling a worm is threaded onto the fishhook of FIGS. 1–2 in a preferred arrangement. In this instance the hook point 22 is slightly embedded in, or lying along the outside of, the artificial lure 26, and, therefore is considered to be weedless. In FIG. 5 the hook point 22 extends significantly outside the body of lure 28, and, therefore is not a weedless bait. In FIG. 6 the artificial lure has a gelatinous tail and a spherical weighted head 29 which is peculiar to a jig. In each instance the hook of FIGS. 1–2 is the same design (although varying in size) and is threaded identically through the gelatinous body of the artificial lure 26, 28, 30. In FIG. 4 the hook has an eye 20, while in FIGS. 5 and 6, the eye of the hook is embedded inside an artificial head 27, 29 of the lure, and that head includes its own eye for attachment to a fishing line.

Figure 9:
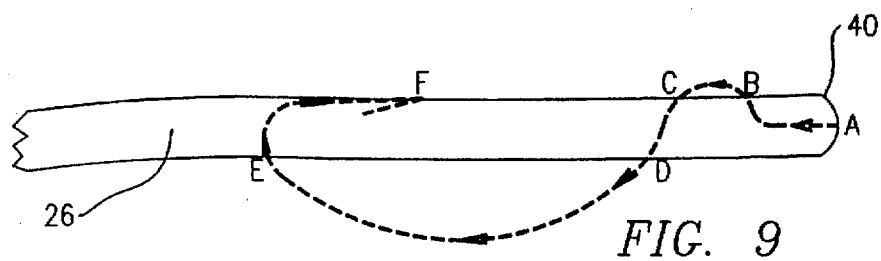
FIG. 9 is a schematic illustration of the route taken to thread a fishhook of this invention through an artificial gelatinous lure representing a worm.

It may be seen with respect to FIG. 4 that when the lure is pulled to the right, in the direction of arrow 41 by reason of a line tied to eye 20, any obstruction such as rocks, weeds and branches which the lure encounters under the water will tend to pull the gelatinous body to the left in the direction of arrow 39; the result being that the lure 26 tends to be pulled away from the hook 21, and particularly, to pull the head 40 of the lure to the left to expose the hook around the eye 20. With this invention the resistance presented by the return bend portion 23 prevents such exposure in all but the most extreme pulling tensions. It should be noted, that in the preferred rigging of the hook of this invention the horizontal component 42 of the return bend portion 23 lies outside of the gelatinous body of the lure 26, 28, 30 and this adds strength to resist the separation of the lure from the shank 21 of the hook, especially near the eye 20 and neck 38. The preferred method of rigging or threading is shown in FIG. 9 with the point 22 of the fishhook entering the head of lure 26 at A, exiting at B, entering again at C, exiting again at D, entering a third time at E, and coming to rest at F (which may be inside or outside the skin of lure 26. It will be seen that horizontal component 42 of the return bend portion 23 lies outside of the body 26 because the threading path exited body 26 at B and reentered at C. This provides some skin strength that would not be available if the path from B to C was entirely inside the body 26.

Figure 10:
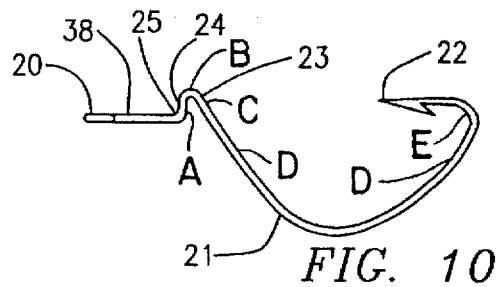
FIG. 10 is a side elevational view of a fifth embodiment of a fishhook of this invention.
Figure 11:
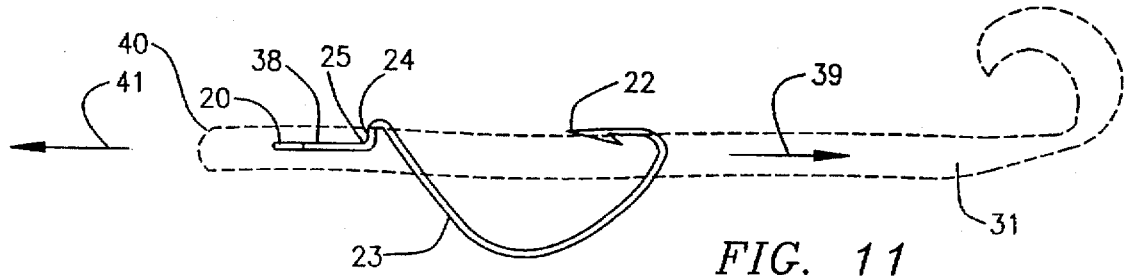
FIG. 11 is a side elevational view of a weedless fish lure employing the fishhook of FIG. 9.

In FIG. 10 is shown still another embodiment of the fishhook of this invention. This design having a V-notch as a return bend portion 23. Component 24 makes an angle 25 of about 90 degrees with the neck 38 that leads to eye 20. When this hook is threaded into an artificial gelatinous plastic lure 31 as shown in FIG. 11, the result is substantially the same picture as FIG. 4. Eye 20 is just inside head 40 of lure 31; the top component of return bend portion 23 is lying on the outside of lure 31; and point 22 of the fishhook is lying at the skin line of lure 31, either just inside the skin or just outside the skin. Pulling in the direction of arrow 41 by reason of a fish line tied to eye 20 produces a stripping force acting in the direction of arrow 39 tending to pull lure 31 off shank 21 of the fishhook when the lure is pulled through underwater obstructions, such as rocks, branches, weeds or the like.

Figure 12:
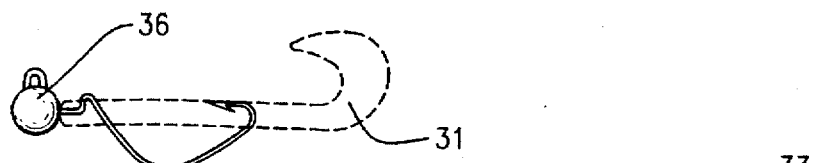
FIG. 12 is a side elevational view of a leadhead fish lure employing the fishhook of FIG. 9.
Figure 13:
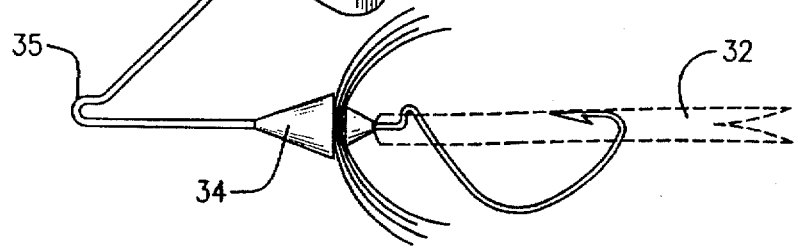
FIG. 13 is a side elevational view of a fish lure with a spinner employing the fishhook of FIG. 9.
Figure 14:
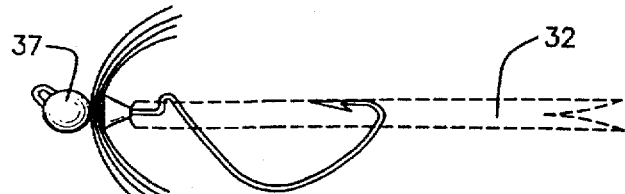
FIG. 14 is a side elevational view of a fish lure jig employing the fishhook of FIG. 9.

FIG. 12 shows a small pan fry leadhead lure using a hook of this invention and a plastic lure impaled in the hook. FIG. 13 shows a spinner-type of lure wherein the eye of the fishhook is embedded in the lure head 34. Spinner 33 is mounted on a sidearm which forms a notch 35 with the spike extending forward from head 34 to form a place to tie on the fishing line. Any type of flexible plastic lure 32 may be employed as a tail for the lure. FIG. 14 shows a typical jig wherein the fishhook of FIG. 10 is employed with a plastic gelatinous lure 32.

As may be determined from a consideration of all five of the embodiments of FIGS. 2, 3, 7, 8 and 10, the return bend 23 is connected to short section 38, opposite to eye 20, by a first portion A extending laterally outwardly from the longitudinal axis of section 38 at an included angle of about 60 degrees to 90 degrees; which in turn is connected to a second portion B extending generally parallel to and offset from such axis and on a surface of and unembedded in a lure; which in turn is connected to a third portion C extending laterally outwardly of such axis; which in turn is connected to a fourth major elongated portion D curving laterally and spaced laterally outwardly of such axis; and in turn is connected to a fifth recurved portion E attached to the point 22 of the fish hook.

As seen from the above description, the present invention improves greatly on prior art designs to inhibit the head of the lure from sliding down the hook shank. This improvement not only affects the appearance of the lure but will result in less lost fish, as the head of the lure will slide down to the bend of the prior art hook just below the point. This problem with prior art hooks has not been effectively solved heretobefore and this invention virtually eliminates this problem without having to add costly lure attachments to the hook.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In a fishhook having an eye, a point generally directed at said eye, and a wire shank connecting said eye to said point, said wire shank further having an elongated curved portion, the improvement which consists essentially of an angular return bend in said shank, said shank including an upper section adjacent said eye having an axis extending longitudinally thereof, said angular bend including a first portion extending from said upper section and laterally outwardly from said axis at an included angle of about 60 degrees to 90 degrees, a second portion generally parallel to said axis, and a third portion extending laterally outwardly from said elongated curved portion and said axis, said second portion being attached between said first and third portions, said angular bend formed and arranged to locate and position said first and third portions embedded in a lure attached to said fishhook and said second portion on an outer surface of and unembedded in a lure attached to said fishhook, and said third portion of said return bend being connected between said elongated curved portion and said point.

2. The fishhook of claim 1 wherein said angular bend portion forms a U-shaped figure of said three portions joined by two interior angles of about 90 degrees.

3. The fishhook of claim 1 wherein said bend portion is spaced away from said eye by a distance of about 1–5 times the diameter of said eye.

4. The fishhook of claim 1 wherein said shank is a smoothly curving length of wire.

5. In an improved artificial fish lure comprising a fishhook with an elongated plastic gelatinous artificial fish lure impaled lengthwise on said fishhook having an eye, a sharp point, and a wire shank connecting said eye to said point; the improvement which comprises the fishhook including a lateral protrusion extending outwardly from said shank closely spaced apart from said eye, the protrusion including a reverse bend in said wire shank extending 0.1–0.3 inch both laterally and longitudinally of said shank, said shank including an upper section adjacent said eye having an axis extending longitudinally thereof, said protrusion including a first portion extending laterally outwardly from said upper section and said axis, a second portion connected to said first portion and disposed generally parallel to said axis, and a third portion connected to said second portion and said shank and extending laterally outwardly from said axis, said protrusion formed and arranged to locate and position said first and third portions embedded in said fish lure when said fish lure is impaled on said fishhook and said second portion on an outer surface of and unembedded in said fish lure when said fish lure is impaled on said fishhook.

6. The fish lure of claim 5 wherein said third portion of said protrusion is positioned closest to said eye and is bent laterally outward from said shank at an angle of about 60 degrees to 90 degrees.

7. The fish lure of claim 5 wherein said eye and said protrusion are spaced apart about 0.5 to 1.0 times the diameter of that portion of said gelatinous fish lure positioned adjacent said eye.

8. A fishhook having an eye, a point generally directed at said eye, and a wire shank portion connecting said eye to said point, said shank portion connected to said eye including a short section having an axis extending longitudinally thereof, the improvement which comprises an angular return bend in said shank portion located closely adjacent said short section, said return bend immediately adjacent said short section, said angular return bend including a first portion extending from said short section and laterally outwardly from said axis at an included angle of about 60 degrees to 90 degrees, a second portion generally parallel to said axis, and a third portion extending laterally outwardly from said axis, said second portion being attached to and located between said first and third portions, said angular return bend formed and arranged to locate and position said first and third portions embedded in a lure attached to said fishhook and said second portion on an outer surface of and unembedded in a lure attached to said fishhook, said second portion being substantially parallel and laterally offset from said short section, said shank having a fourth major elongated portion attached to said third portion and curving laterally and spaced laterally outwardly from said longitudinal axis and a fifth recurved portion attached between said fourth portion and said point.

9. The fishhook of claim 8 wherein said angular bend portion is substantially U-shaped, said three portions joined by two interior angles of about 90 degrees.

10. The fishhook of claim 8 wherein said short section between said bend portion and said eye is spaced by a distance of about 1–5 times the diameter of said eye.

11. The fishhook of claim 8 wherein said shank is a smoothly curving length of wire.

12. The fishhook of claim 8 wherein said angular bend portion is substantially V-shaped with said short section and said bend portion intersecting at about 90 degrees.

13. The fishhook of claim 8 wherein said point is spaced above said short section and said point and lateral extent of said bend portion lie in substantially the same plane.

* * * * *